3,239,530
PROCESS FOR LYSERGIC ACID HYDRAZIDES
Albert Hofmann, Bottmingen, Jürg Rutschmann, Oberwil, Basel-Land, Paul Stadler, Biel-Benken, and Franz Troxler, Bottmingen, Switzerland, assignors to Sandoz Ltd., Basel, Switzerland
No Drawing. Filed Jan. 13, 1964, Ser. No. 337,163
3 Claims. (Cl. 260—285.5)

The present application is a continuation-in-part of copending application Serial No. 255,174, filed January 31, 1963, now abandoned, which in turn was a continuation-in-part of application Serial No. 144,072, filed October 10, 1961, now also abandoned.

The present invention relates to new optically active lysergic acid derivatives and to a process for the production of optically active lysergic acid derivatives.

The optically active products of the process correspond to the formula:

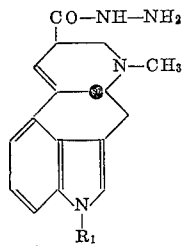

I wherein $R_1$ signifies a member selected from the group consisting of hydrogen, alkyl containing from 1 to 4 carbon atoms, alkenyl containing from 3 to 4 carbon atoms, and benzyl. The molecular asymmetry of the compounds resides in the carbon atom marked with a dot in Formula I, the hydrogen atom attached to it lying above the plane of the paper in the D-series.

The present invention also relates to new compounds of the Formula I, wherein $R_1$ signifies a member of the group consisting of alkyl containing from 1 to 4 carbon atoms inclusive, alkenyl containing from 3 to 4 carbon atoms, and benzyl, and their physiologically acceptable acid addition salts.

The process consists of reacting an optically active lysergic acid derivative of the formula:

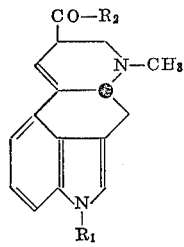

II wherein $R_1$ has the above significance and $R_2$ signifies a member selected from the group consisting of alkoxy containing from 1 to 4 carbon atoms inclusive, amino (including a member selected from the group consisting of primary amino, alkylamino, hydroxyalkylamino, in which the alkyl portion contains from 1 to 4 carbon atoms inclusive), or a member selected from the group consisting of tripeptides of the type of the natural ergot alkaloids, with excess hydrazine in the presence of at least one equivalent of acid for every mol of compound II, the expression excess meaning that the number of mols of hydrazine must be at least equal to the number of equivalents of acid+2. The acid used for the process may be selected from the inorganic or organic acids of sufficient strength, e.g. with a pK value smaller than 5.

Examples of acids which may be used are inorganic acids, such as hydrochloric, hydrobromic or sulfuric acid; alkyl- or arylsulfonic acids, for example methanesulfonic or benzenesulfonic acid; aliphatic and aromatic carboxylic acids such as formic, acetic or benzoic acid.

The acid may be added to the reaction mixture as such or, simpler, by using a preformed acid addition salt of the alkaloid or of part of the hydrazine.

The use of a solvent is as a rule unnecessary, as the excess hydrazine suffices to bring all reactants into solution. Nevertheless an additional solvent, such as a lower alcohol or a glycol, may be useful in certain cases.

From the U.S. Patent 2,090,429, as well as from Hoppe Seyler's Zeitschrift für physiologische Chemie, vol. 250, page 7 (1937), and from Helv. Chimica Acta, vol. 26, pages 922–928 (1943), it is known that by treating a derivative of the optically active D-lysergic acid or D-isolysergic acid, e.g. one of the naturally occurring ergot alkaloids, D,L-isolysergic acid hydrazide, an optically inactive product, results. The optically active compound, D-isolysergic acid hydrazide, which is the only useful one for the synthesis of products of pharmaceutical interest, must subsequently be separated from the racemic mixture with the aid of an optically active acid, e.g. di-(p-toluyl)-L-tartaric acid as demonstrated e.g. in the U.S. Patent 2,447,214. This procedure is experimentally cumbersome and more than half of the original material is lost, mainly as the useless L-isolysergic acid hydrazide.

On the contrary to this older process, the principal advantage of the new procedure lies in the fact that the cleavage of D-lysergic acid derivatives by hydrazine can be effected without racemization in a single, simple step. The yields of useful products are in the range of 80–95% of the theory.

A further advantage of the new process lies in the fact that the reaction proceeds under relatively mild conditions with fewer side reactions occurring concurrently. A reaction temperature of 80 to 90° is as a rule most suitable. The time of reaction at this temperature is in the range of one to a few hours, whereas at e.g. 135° it is only a few minutes. Temperature and time conditions are of course chosen as mild as possible, as with unnecessarily long reaction times and high temperatures partial racemization may occur.

A further technical advantage of the new process is the fact that starting materials may be used which could not be cleaved by hydrazine alone, e.g. the compounds with $R_2$ equal to amino, alkylamino or hydroxyalkylamino (e.g. ergometrine).

A further important technical advantage of this invention lies in the fact that it is now possible, starting from 1-methyl-D-lysergic acid hydrazide which is obtained according to Example 3, to prepare economically the well known 1-methyl-D-lysergic acid-(1')-hydroxy-(+)-butylamide-(2') of the formula:

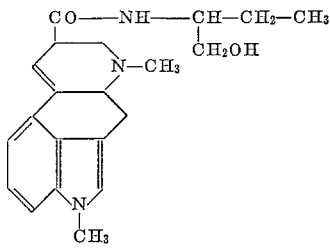

III

This compound (Methylsergide) is a potent serotonin antagonist [reference is made to Doepfner and Cerletti, Int. Arch. of Allergy vol. 12, page 39 (1958)] and has already acquired great therapeutical importance in the prophylactic treatment of various forms of headache [reference is made to Friedman and Elkind, J. Amer.

Med. Assoc., vol. 184, pages 125–128 (1963); Abbott, Bull. of the Los Angeles Neurological Soc., vol. 27, pages 137–146 (1962), and Friedman, Neurology, vol. 13, pages 27–33 (1963)].

As an illustration the synthesis of this compound by the new process of the present invention [A] as well as by the old process [B] is represented in the following diagram. It is easily seen that the present process results in the circumvention of the great loss of material in the form of useless L-compound and in a reduction of the necessary chemical steps by one. The consequence is a considerable saving of time and materials, as well as a further increase in overall yield.

Thus, the new process, for example in preparing the hitherto unknown 1-methyl-D-lysergic acid hydrazide, is an important technical advance.

The process in accordance with the invention may, for example, be effected as follows: One part by weight of compound II in the form of a salt, e.g. ergotamine hydrochloride, is heated with four parts by weight of anhydrous hydrazine for one hour at 90° C. The reaction mixture is then diluted, preferably with water, the excess hydrazine and water distilled off azeotropically, and the residue shaken between aqueous tartaric acid and an inert, water-immiscible solvent, e.g. chloroform or ether. The aqueous phase is made alkaline and the final product taken up in a water-immiscible solvent, e.g. chloroform.

Should a compound II, in which $R_2$ signifies $NH_2$ or the radical of an alkylamine or hydroxyalkylamine, having from 1 to 4 carbon atoms inclusive in the alkyl portion, be used, then the reaction mixture, after heating with hydrazine, may be directly diluted with water and extracted with a water-immiscible solvent, e.g. chloroform, if desired, after the addition of ammonia.

The crude product obtained after evaporation of the solvent is generally a mixture of the optically active hydrazides of the lysergic and, predominantly, of the isolysergic acid series, which may be separated in accordance with known methods, e.g. by crystallization and/or chromatography or by conversion to a salt with a suitable acid.

Compounds I may be used as intermediate products in the production of pharmaceuticals.

Of the compounds I the 1-methyl-D-lysergic acid hydrazide and 1-methyl-D-isolysergic acid hydrazide are new and are included within the scope of this invention.

In the following non-limitative examples all temperatures are stated in degrees centigrade and are uncorrected.

DIAGRAM

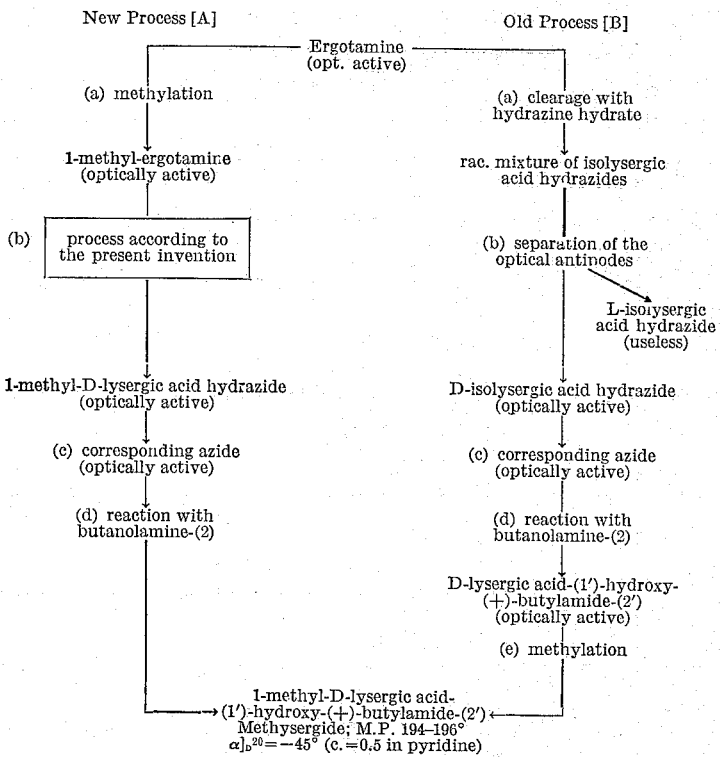

Example 1

1.16 g. of ergotamine hydrchloride are heated with 4 cc. of anhydrous hydrazine for 1 hour to 90°, 20 cc. of water are then added, the water and the hydrazine hydrate distilled off and the residue shaken between tartaric acid and ether. The bases liberated after making the aqueous phase alkaline are shaken with chloroform and the crude product resulting after evaporation of the chloroform cromatographed on aluminum oxide. The resulting D-isolysergic acid hydrazide is washed into the filtrate with chloroform containing 0.5% of ethanol. Prisms from methanol/ether. Melting point 202°. $[\alpha]_D^{20} = +445°$ (c.=0.5 in pyridine).

A small quantity of D-lysergic acid hydrazide is then washed into the filtrate with chloroform containing 2% of ethanol. Prisms from methanol/ether. Melting point 215°. $[\alpha]_D^{20} = +10°$ (c.=0.5 in pyridine).

Example 2

1 g. of isolysergic amide hydrochloride is heated with 4 cc. of hydrazine for 50 minutes to 90°, 20 cc. of water and 5 cc. of concentrated ammonia then added and the mixture shaken with chloroform. The crude product remaining after evaporation of the chloroform is heated with 15 cc. of methanol, the resulting D-lysergic acid hydrazide remaining undissolved. Melting point 216° $[\alpha]_D^{20} = +10°$ (c.=0.5 in pyridine). The methanol solution is evaporated to dryness and the residue chromatographed on aluminum oide. D-isolysergic hydrazide is washed into the filtrate with chloroform containing 0.5% of ethanol. The melting point and optical rotation are similar to those given in Example 1. (c.=0.5 in pyridine).

Example 3

A solution of 1.6 g. of 1-methyl-ergotamine hydrochloride in 6.4 cc. of anhydrous hydrazine are heated for 1 hour at 90°, the mixture diluted with 50 cc. of water, the water and the hydrazine hydrate are distilled off and after the addition of a further 6.4 cc. of anhydrous hydrazine the remaining procedure is repeated. The residue is then shaken between a diluted tartaric acid solution and chloroform. The bases liberated after the tartaric acid solution has been made alkaline are shaken with chloroform and the crude product remaining after evaporation of the chloroform is chromatographed on a column of 25 g. of aluminium oxide. 1-methyl-D-isolysergic acid hydrazide is washed into the filtrate with chloroform containing 0.5% of ethanol. The compound crystallizes from ethanol in the form of nice leaflets. Melting point 201–204°. $[\alpha]_D^{20} = +400°$ (c.=0.5 in pyridine). Keller's colour reaction: blue.

The 1-methyl-D-lysergic acid hydrazide is then washed into the filtrate with 1 to 2% of ethanol. Prisms from ethanol. Melting point 194–195°. $[\alpha]_D^{20} = +14°$ (c.=0.5 in pyridine). Keller's colour reaction: blue.

*Example 4*

1 g. of lysergic acid propanolamide (ergometrine) is heated with 5 cc. of anhydrous hydrazine and a solution of 350 mg. of hydrogen bromide in 2 cc. of ethanol to 90° for 1 hour. The reaction mixture is worked up in the manner described in Example 2, the products being D-lysergic acid hydrazide and predominantly D-isolysergic acid hydrazide with the properties indicated in Example 1.

*Example 5*

A solution of 1 g. of ergotamine is heated with 5 cc. of anhydrous hydrazine and 1 cc. of glacial acetic acid to 120° for 30 minutes. The mixture is worked up as described in Example 1, the product being essentially D-isolysergic acid hydrazide with the properties mentioned.

*Example 6*

1 g. of lysergic acid amide is heated with 5 cc. of hydrazine in the presence of 500 mg. of methansulfonic acid in 2 cc. of n-butanol for 40 minutes to 100°. The products, D-lysergic acid hydrazide and predominantly D-isolysergic acid hydrazide, are isolated as described in Example 1.

What is claimed is:

1. A method for the preparation of optically active compounds of the formula:

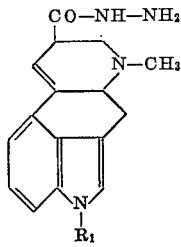

wherein $R_1$ is a member selected from the group consisting of hydrogen, alkyl of 1 to 4 carbon atoms, alkenyl of 3 to 4 carbon atoms, and benzyl, which comprises heating an optically active compound of the formula:

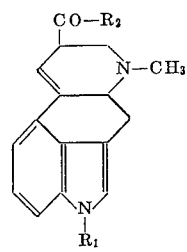

wherein $R_1$ has the aforesaid significance and $R_2$ is a member selected from the group consisting of alkoxy of 1 to 4 carbon atoms, amino, alkylamino, hydroxyalkylamino and the tripeptide radicals of the natural water-insoluble ergot alkaloids at a temperature of 80° to about 135° for a time not substantially in excess of one hour with an excess of anhydrous hydrazine in the presence of at least one equivalent, based on the molar amount of optically active compounds of the Formula II, of a hydrogen ion producing agent, selected from the group consisting of inorganic and organic acids of a pK value smaller than 5.

2. A method for the production of 1-methyl-D-lysergic acid hydrazide with the optical rotation of $[\alpha]_D^{20} = +14°$ (c.=0.5 in pyridine) comprising reacting optically active 1-methyl ergotamine at a temperature of 80–135° C. for a time not substantially in excess of one hour with an excess of anhydrous hydrazine in the presence of at least one equivalent of a hydrogen ion producing agent selected from the group consisting of inorganic and organic acids of pK value smaller than 5 and isolating the hydrazide product.

3. A method for the production of 1-methyl-D-isolysergic acid hydrazide with the optical rotation of $[\alpha]_D^{20} = +400°$ (c.=0.5 in pyridine) comprising reacting optically active 1-methyl-ergotamine at a temperature of 80–135° C. for a time not substantially in excess of one hour with an excess of anhydrous hydrazine in the presence of at least one equivalent of a hydrogen ion producing agent selected from the group consisting of inorganic and organic acids of pK value smaller than 5 and thereafter isolating the hydrazide product.

References Cited by the Examiner

UNITED STATES PATENTS

| | | | |
|---|---|---|---|
| 2,447,214 | 8/1948 | Stool et al. | 260—285 |
| 2,796,419 | 6/1957 | Kornfeld et al. | 260—285.5 |
| 3,085,092 | 4/1963 | Hofmann et al. | 260—285.5 |

FOREIGN PATENTS 811,964   4/1959   Great Britain.

IRVING MARCUS, *Primary Examiner.*

NICHOLAS S. RIZZO, *Examiner.*